(12) United States Patent
Groben

(10) Patent No.: US 10,000,318 B2
(45) Date of Patent: Jun. 19, 2018

(54) SAFETY DEVICE AGAINST EXCESS TEMPERATURE

(75) Inventor: Martin Groben, Sulzbach (DE)

(73) Assignee: HYDAC TECHNOLOGY GMBH, Sulzbach/Saar (DE)

( * ) Notice: Subject to any disclaimer, the term of this patent is extended or adjusted under 35 U.S.C. 154(b) by 1175 days.

(21) Appl. No.: 13/261,433

(22) PCT Filed: Feb. 26, 2011

(86) PCT No.: PCT/EP2011/000946
§ 371 (c)(1),
(2), (4) Date: Oct. 23, 2012

(87) PCT Pub. No.: WO2011/113523
PCT Pub. Date: Sep. 22, 2011

(65) Prior Publication Data
US 2013/0082054 A1    Apr. 4, 2013

(30) Foreign Application Priority Data

Mar. 18, 2010   (DE) .......................... 10 2010 011 878

(51) Int. Cl.
*F16K 17/40* (2006.01)
*B65D 51/00* (2006.01)
(Continued)

(52) U.S. Cl.
CPC .............. *B65D 51/00* (2013.01); *F15B 1/083* (2013.01); *F16K 17/383* (2013.01); *F17C 13/04* (2013.01); *F17C 13/06* (2013.01); *F17C 13/12* (2013.01); *F15B 1/24* (2013.01); *F15B 2201/205* (2013.01); *F15B 2201/31* (2013.01); *F15B 2201/4155* (2013.01); *F17C 2201/019* (2013.01); *F17C 2201/0119* (2013.01); *F17C 2201/056* (2013.01); *F17C 2203/0617* (2013.01); *F17C 2205/0305* (2013.01); *F17C 2205/0314* (2013.01);
(Continued)

(58) Field of Classification Search
CPC ....... B65D 51/00; F15B 1/083; F16K 17/383; F17C 13/04; F17C 13/06; F17C 13/12
USPC ....... 137/72, 74, 75, 79, 68.11, 68.12, 68.19
See application file for complete search history.

(56) References Cited

U.S. PATENT DOCUMENTS 3,633,596 A * 1/1972 Gerber .......................... 137/68.3
4,006,780 A * 2/1977 Zehr ............................... 169/26
(Continued)

FOREIGN PATENT DOCUMENTS

DE    19 37 165 A1    2/1971
DE    22 29 620 A      1/1974
(Continued)

*Primary Examiner* — Minh Le
(74) *Attorney, Agent, or Firm* — Wenderoth, Lind & Ponack, L.L.P.

(57) ABSTRACT

A safety apparatus is for containers loaded by gas pressure, in particular the gas side (13) of hydropneumatic devices such as hydraulic accumulators (1). The safety apparatus has a connection device (19) that can be attached to the pressure chamber of the container to form a passage (25) between the gas side (13) of the container and the outside. A structure (27) normally blocks the passage (25) and under the influence of temperature can be transferred into a state that allows a flow path through the passage (25) to be cleared.

16 Claims, 5 Drawing Sheets

(51) Int. Cl.
　　　*F15B 1/08*　　　(2006.01)
　　　*F16K 17/38*　　　(2006.01)
　　　*F17C 13/04*　　　(2006.01)
　　　*F17C 13/06*　　　(2006.01)
　　　*F17C 13/12*　　　(2006.01)
　　　*F15B 1/24*　　　(2006.01)

(52) U.S. Cl.
　　　CPC ............... *F17C 2205/0317* (2013.01); *F17C 2205/0332* (2013.01); *F17C 2205/0382* (2013.01); *F17C 2205/0394* (2013.01); *F17C 2221/014* (2013.01); *F17C 2223/0123* (2013.01); *F17C 2223/036* (2013.01); *F17C 2250/043* (2013.01); *F17C 2250/0439* (2013.01); *F17C 2250/072* (2013.01); *F17C 2260/023* (2013.01); *F17C 2260/042* (2013.01); *F17C 2270/0554* (2013.01); *F17C 2270/0563* (2013.01)

(56) References Cited

U.S. PATENT DOCUMENTS

| | | | |
|---|---|---|---|
| 4,365,643 A * | 12/1982 | Masclet et al. | 137/70 |
| 4,431,716 A * | 2/1984 | Eppley et al. | 429/53 |
| 4,733,872 A | 3/1988 | Sugimura | |
| 4,744,383 A * | 5/1988 | Visnic et al. | 137/72 |
| 4,899,777 A * | 2/1990 | Stone et al. | 137/74 |
| 4,922,944 A * | 5/1990 | Mueller et al. | 137/72 |
| 5,048,554 A * | 9/1991 | Kremer | 137/69 |
| 5,495,865 A * | 3/1996 | Wass et al. | 137/68.3 |
| 5,511,576 A | 4/1996 | Borland | |
| 5,632,297 A * | 5/1997 | Sciullo et al. | 137/73 |
| 5,941,269 A * | 8/1999 | Ingle | 137/74 |
| 6,006,774 A | 12/1999 | Lhymn et al. | |
| 6,367,499 B1 | 4/2002 | Taku | |
| 6,367,500 B1 | 4/2002 | Kerger et al. | |
| 6,814,097 B2 * | 11/2004 | Girouard | 137/72 |
| 2001/0018929 A1 | 9/2001 | Taku | |
| 2003/0015236 A1 | 1/2003 | Kerger | |
| 2010/0308060 A1* | 12/2010 | Lammers | 220/582 |

FOREIGN PATENT DOCUMENTS

| | | |
|---|---|---|
| DE | 32 45 618 A1 | 6/1984 |
| DE | 199 11 530 C2 | 9/2000 |
| DE | 10 2006 020 388 A1 | 10/2007 |
| DE | 10 2008 003 607 A1 | 7/2008 |
| DE | 10 2007 017 429 A1 | 10/2008 |
| EP | 1 418 372 A1 | 5/2004 |
| EP | 1 510 752 A1 | 3/2005 |
| FR | 2 844 572 A1 | 3/2004 |
| JP | 2009 275862 A | 11/2009 |

* cited by examiner

SAFETY DEVICE AGAINST EXCESS TEMPERATURE

FIELD OF THE INVENTION

The invention relates to a safety device for containers loaded by gas pressure, in particular the gas side of hydropneumatic devices such as hydraulic accumulators.

BACKGROUND OF THE INVENTION

In the operation of devices with containers that contain a pressurized gas, for example, hydraulic accumulators, potential risks could arise at the installation site that must be considered, especially in conjunction with the possible occurrence of external effects. One important aspect that should be considered in this context is that a temperature increase that occurs in the event of an external fire at the installation site of the pertinent system should not lead to failure of the container.

SUMMARY OF THE INVENTION

An object of the invention is to provide an improved safety device that ensures reliable protection of the gas side of pertinent devices against unacceptable pressure spikes caused by increased ambient temperatures.

This object is basically achieved according to the invention by a safety device having a structure integrated into a connecting device that is provided on the pressure chamber of the pertinent container and that normally blocks a passage extending between the gas side and the outside. Under the influence of temperature, the structure can be transferred into a state that clears a flow path through the passage. Thus, in the event of a fire, the connecting device ensures pressure relief. Because the device has a connecting part attached directly to the pressure chamber to be protected, the device responds to temperature elevations that occur directly on the pressure chamber to be protected so that high operational safety is ensured. Advantageously, the connecting device can be provided, for example, in a hydraulic accumulator on its fill port via which the gas side can be filled with the working gas.

The structure that responds to the effect of temperature can especially advantageously be a solder of an alloy having a desired melting point.

In exemplary embodiments characterized by an especially simple structure, the solder, located directly in the passage, forms a sealing plug that melts due to a temperature increase.

If the passage on its end bordering the gas side extends axially and on the other end undergoes transition into exit channels perpendicular to the axial direction, the risk of damage to the vicinity by ejection of the entire amount of the solder forming the molten plug, with the ejection taking place in a straight line in the axial direction, is reduced.

As an alternative to using the solder as the sealing plug that directly blocks the passage, in alternative exemplary embodiments, the solder can also be provided as an element that controls a valve device. For example, the passage can widen toward an axial section bordering the gas side, coaxially thereto, to form a hollow cylinder. In the hollow cylinder, a valve piston is guided for movement axially and is secured by unmelted solder in a closed valve position blocking the passage. When the solder melts, the valve piston can be moved out of the closed position by the gas pressure into an open valve position to clear the flow path.

In other exemplary embodiments, on the end region of the passage facing away from the gas side, the connecting device can have a sealing cap that forms a spring housing in which a spring arrangement is held in a tensioned state by unmelted solder. When the solder melts, the spring arrangement by its spring force moves a control element that can be moved axially in the spring housing into a position that causes the flow path to be cleared.

In such exemplary embodiments, the blocking element of the passage can be a rupture disk that blocks it. The control element is pretensioned by the spring arrangement and can have a mandrel that is moved by the spring force to pierce the rupture disk when the solder melts.

In one alternative exemplary embodiment that is actuated by spring force, the passage has a shutoff valve as a blocking element. The control element pretensioned by the spring arrangement has a plunger by whose movement the shutoff valve can be forced into the clearance position when the solder melts.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure.

DETAILED DESCRIPTION OF THE INVENTION

Figure 1:
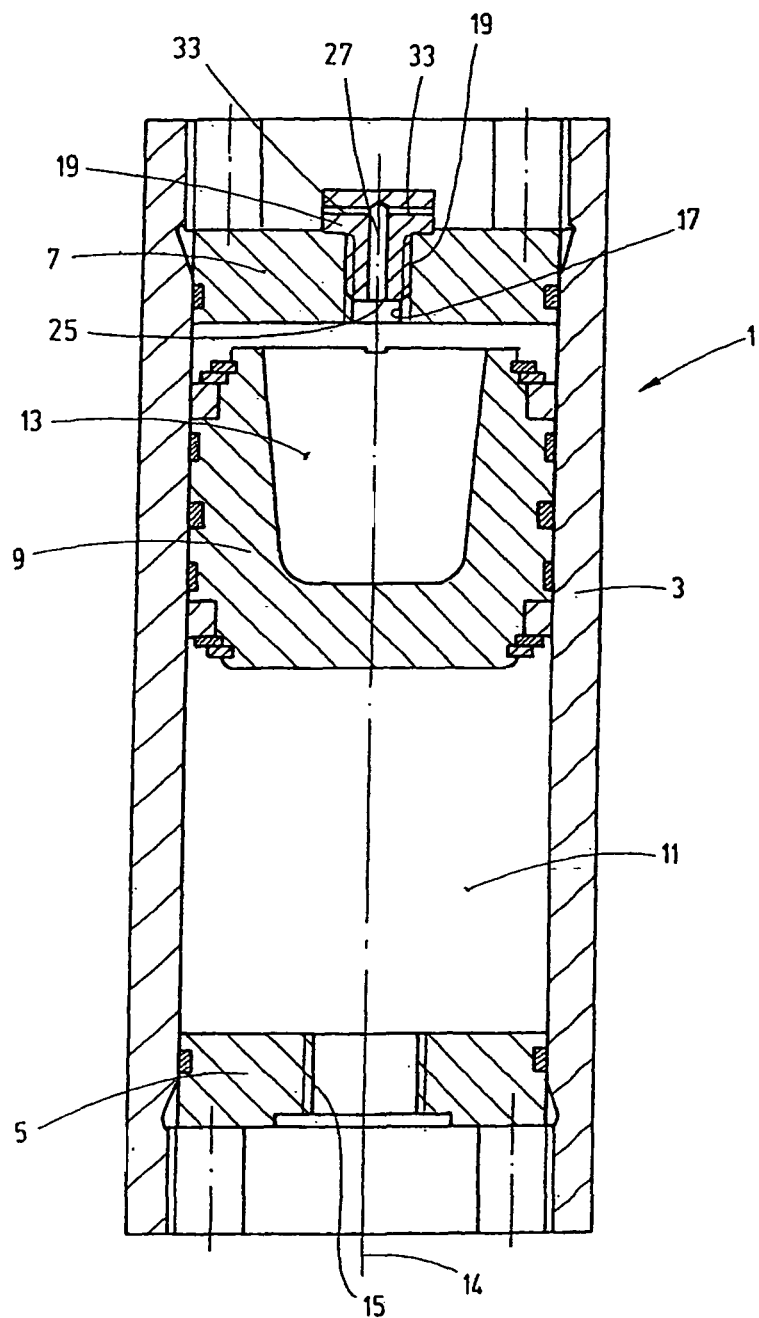
FIG. 1 is a side elevational view in section of a hydropneumatic piston accumulator, provided with a safety device according to a first exemplary embodiment of the invention, drawn schematically simplified.

FIG. 1 shows a hydraulic accumulator 1 in the form of a piston accumulator of known design with a hollow cylindrical accumulator housing 3 closed by a bottom-side cover 5 and a head-side cover 7. In the conventional manner for these accumulators, a cup piston 9 can be moved axially in the housing 3 and separates an oil side 11 from a gas side 13. The oil side 11 can be connected to a hydraulic system (not shown), via an oil port 15 coaxial to the longitudinal axis 14. In the head-side cover 7, likewise coaxially to the longitudinal axis 14, a gas fill port 17 is provided via which gas port the gas side 13 can be supplied with a working gas, such as nitrogen, with a predetermined fill pressure.

Figure 3:
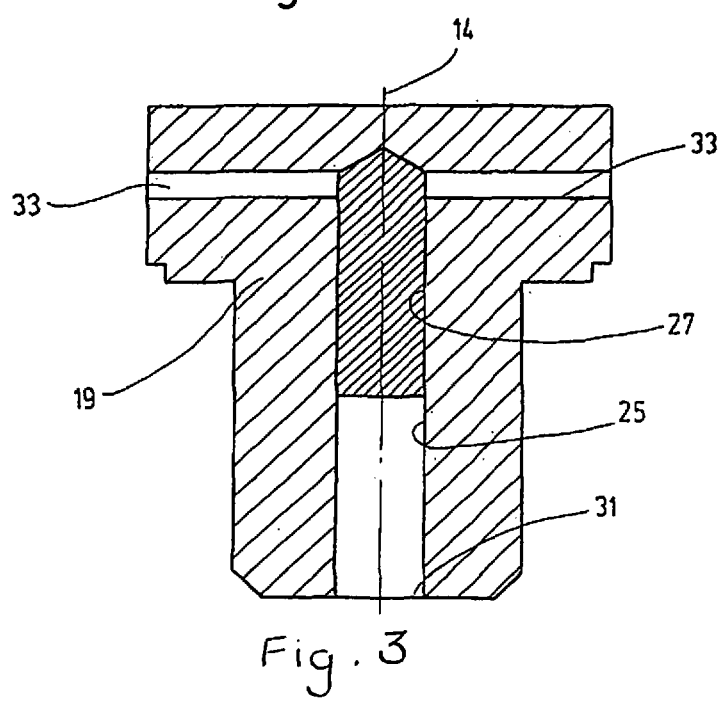
FIG. 3 is an enlarged side elevational view in section of the safety device of FIG. 1.

In FIG. 1, the accumulator 1 is provided with a first exemplary embodiment of the safety device according to the invention, with the first exemplary embodiment shown individually in FIG. 3. The safety device forms a connection device 19 screwed directly into the fill port 17 of the cover 7, so that the device directly borders the gas side 13 of the accumulator 1.

Figure 2:
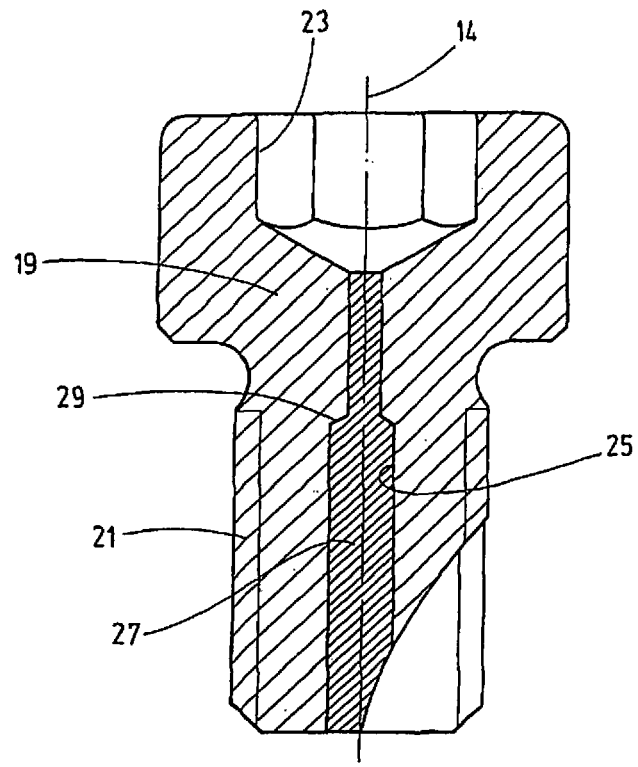
FIG. 2 is a side elevational view in section of a safety device according to a second exemplary embodiment of the invention, shown enlarged roughly three times compared to a practical embodiment.

FIG. 2 shows a second exemplary embodiment of the safety device in an individual representation. As is apparent, the connection device 19 has the form of a hollow screw with an external thread 21 that can be screwed into the fill port 17 and has a hexagonal socket 23 located in the head of the screw. From the shaft end to the hexagonal socket 23, the screw is penetrated by a passage 25 that is coaxial to the longitudinal axis 14 and that has a diameter tapered in the longitudinal region adjacent to the hexagonal socket 23 relative to the remaining longitudinal region. In the passage 25, a solder 27 with an alloy chosen such that the melting point is roughly in the range from 160° C. to 170° C. is located. In the unmelted state, the solder 27 forms a sealing plug that blocks the passage 25 and that is additionally secured by its tapering site 29 against being pushed out of the passage 25 due to gas pressure. A temperature increase that may occur in a fire above the melting point of the solder 27 leads to the solder 27 being expelled to the outside, and thus, to the clearance of a flow path through the passage 25 to relieve the pressure in the container.

FIG. 3 shows the first exemplary embodiment of the safety device modified compared to FIG. 2 and is shown in FIG. 1 in its operating state connected to the accumulator 1. As in the example of FIG. 2, the connecting device 19 has the form of a screw that can be screwed directly into a gas fill port 17, with an inner passage 25. On the end 31 of the passage 25 bordering the gas side, the passage 25 extends coaxially. On the other end, passage 25 undergoes transition into exit channels 33 that are perpendicular to the axial direction. As in the example of FIG. 2, in the passage 25, solder 27 forms a sealing plug that is axially secured in addition at the transition site between the coaxial part of the passage 25 and the cross channels 33 that continue it. Only two cross channels 33 are visible in FIG. 3. In fact, a total of six channels 33 are arranged in a star shape and extend in the radial direction. As FIG. 3 furthermore shows, the solder 27 as a sealing plug is supported on the face side by the housing wall of the connecting device 19. This arrangement yields an increased margin of safety compared to the solution as shown in FIG. 2, where the solder 27 on the free face side of the connecting device 19 can emerge directly into the open. To the extent that the connecting device 19 is addressed, it preferably forms a terminal plug for the fill opening of the hydraulic accumulator container.

The material for the solder 27 can be especially a soft solder that is readily available on the market under the commercial designation 178-190Gr.C-L-Sn62PbAg2-2.2. In particular for the solutions as shown in FIGS. 2 and 3, the solder 27 can be made entirely as hard solder or to mix different types of solder with one another using material technology or to use them in combination with one another. For example, a bead of solder that faces toward the vicinity could be of a more resistant hard solder material, whereas the inner solder part facing the accumulator could still be a soft solder material.

While in the example of FIG. 2 the melting solder 27 is expelled axially away from the pertinent container and can represent a risk to the vicinity, in the example of FIG. 3, the expulsion of molten solder takes place simply divided into partial amounts according to the number of channels 33. As is apparent from FIG. 1, the melt emerging in the transverse direction can be captured by projecting walls of the accumulator housing 3 and screened relative to the vicinity.

Figure 4:
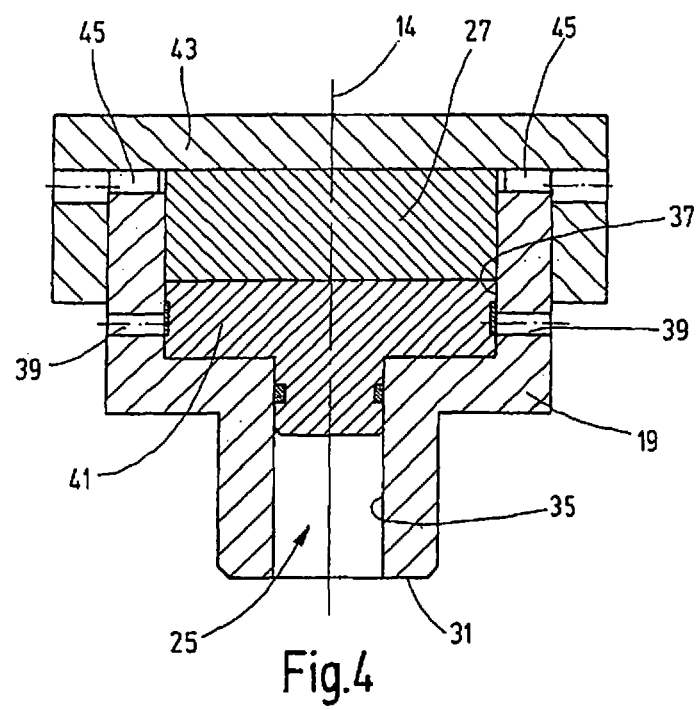
FIG. 4 is a side elevational view in section of a safety device according to a third exemplary embodiment of the invention, drawn on a somewhat smaller scale and schematically simplified compared to FIG. 3.

FIG. 4 shows a modified example with a connecting device 19 that can likewise be screwed directly into a pertinent fill port. The inner passage 25 on its end 31 bordering the gas side in turn has a first axial section 35 that transitions into a widening forming a hollow cylinder 37. In the vicinity of the base region of this hollow cylinder 37, the passage 25 continues with cross channels 39 that lead to the outside. In the axial section 35 and in the hollow cylinder 37, a valve piston 41 with periphery-side sealing is guided to be able to move axially, but is normally secured in the closed valve position shown in FIG. 4. In this closed valve position, the periphery of the piston 41 seals at the cross channels 39 of the passage 25 by unmelted solder 27 found between a cover part 43 that seals the hollow cylinder 37 and the bordering side of the piston 41. When the melting point of the solder 27 is reached, solder 27 emerges via lateral exit openings 45 so that the gas pressure moves the valve piston 41 out of the closed position shown in FIG. 4 and clears the flow path via the cross channels 39.

Figure 5:
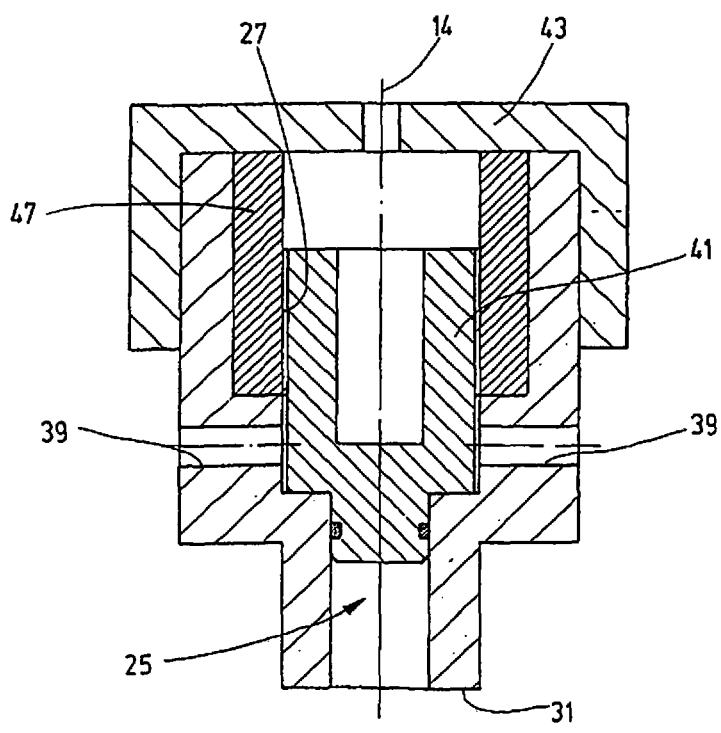
FIG. 5 is a side elevational view in section of a safety device according to a fourth exemplary embodiment of the invention, drawn on a somewhat smaller scale and schematically simplified compared to FIG. 3.

FIG. 5 shows an exemplary embodiment similar to FIG. 4 in which unmelted solder 27 in turn secures a valve piston 41 in the closed position such that cross channels 39 of the passage 25 are blocked by valve piston 41.

Unlike in the example of FIG. 4, in FIG. 5 the space between the valve piston 41 and the cover part 43 is not filled with solder. The piston 41 is secured in the closed position shown in FIG. 5 by it being held to be axially immovable in a transition fit in an inner cylinder 47 made of an Al alloy. The inner cylinder 47 in turn is supported on the cover part 43. The transition fit between the inner cylinder 47 and the valve piston 41 is formed by a layer of solder 27 applied as a coating on the outer periphery of the piston 41 so that the transition fit is formed between the aluminum material of the cylinder 47 and the steel piston 41. When the temperature rises, the solder 27 melts, and thus, any fit no longer exists between the inner cylinder 47 and the valve piston 41. The valve piston 41 then can move by the gas pressure into the clearance position so that the pressure drops via the cross channels 39.

Figure 6:
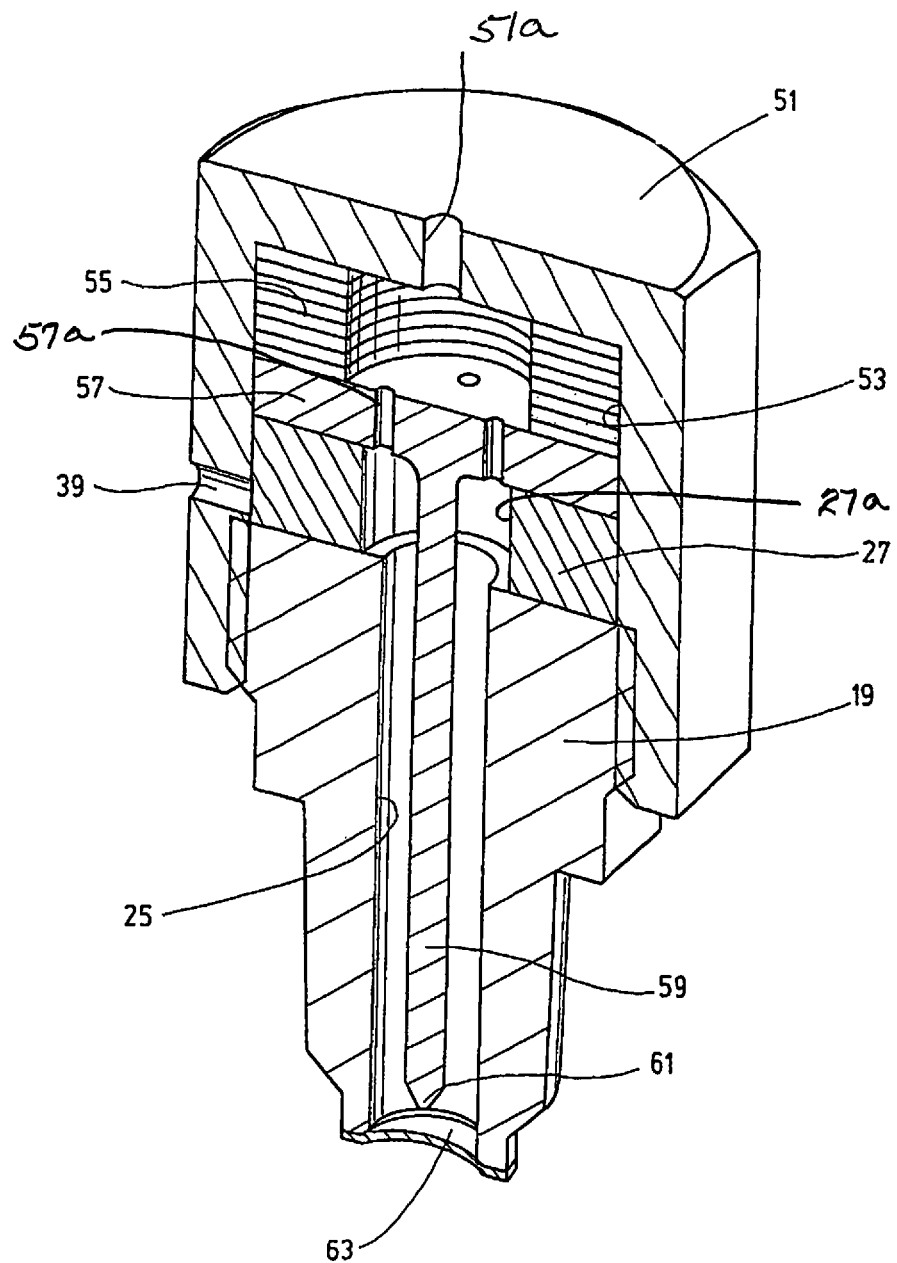
FIG. 6 is a perspective view in section of a safety device according to a fifth exemplary embodiment of the invention shown schematically simplified and on a still further enlarged scale.

In the example of FIG. 6, the connecting device 19 has a screw-on sealing cap 51 that forms a spring housing 53 in which a cup spring package 55 is clamped between the sealing cap 51 and a control element 57 that is supported against axial displacement on the unmelted solder 27 forming a ring body with a central or ring opening 27a. The control element 57 has a central mandrel 59 that extends through the ring opening 27a of the solder 27 into the passage 25 and ends in a mandrel tip 61. The tip 61 is located at a short distance from a rupture disk 63 made of an austenitic material and located on the inner end of the passage 25. The spring 55, solder 27 and control device 57 are axially aligned in a wider axial portion of passage 25 in sealing cap 51, with control device 57 being coaxially between unmelted solder 27 and spring 55. When the solder 27 melts, the tensioned cup spring package 55 drives the mandrel 59 in the direction of the rupture disk 63. Disk 63 is then pierced so that the pressure drops over the cross channels 39.

In the example as shown in FIG. 6, preferably in the case of failure, the solder 27 is displaced via the cross channel 39. The main venting function is achieved via the axial holes or openings 57*a* spaced laterally outwardly from mandrel 59, shown in FIG. 6, within the control element 57, and vent opening or hole 51*a* in the sealing cap 51, respectively.

Figure 7:
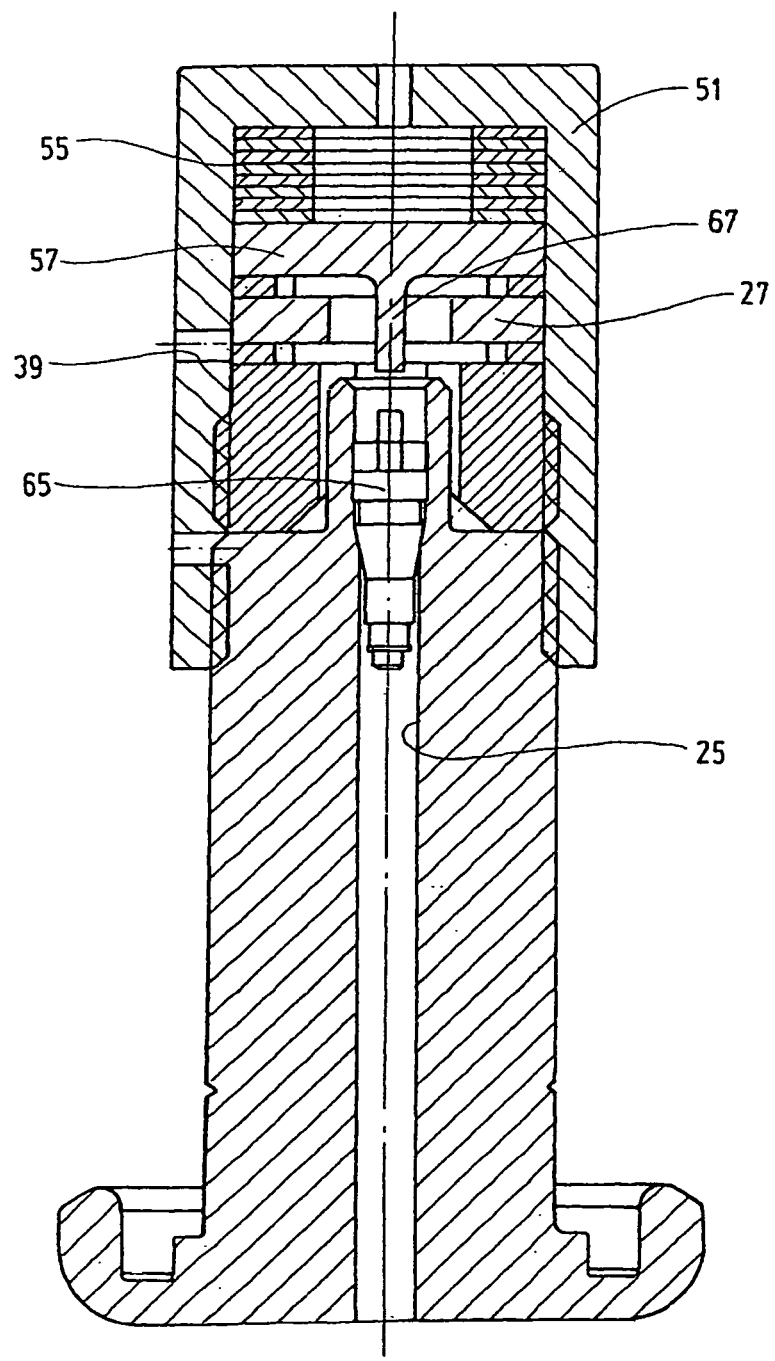
FIG. 7 is a schematically simplified side elevational view in section of a safety device according to a sixth exemplary embodiment of the invention.

In the example of FIG. 7, the screwed-on sealing cap 51 in turn forms a spring housing for a cup spring package 55 that, as in FIG. 6, is clamped between the sealing cap 51 and a control element 57. Control element 57 can be moved longitudinally in the sealing cap 51, but is supported via a layer of solder 27 forming a ring body. Unlike in FIG. 6, the actual blocking element in the passage 25 is not a rupture disk, but a shutoff valve 65 that can be unblocked by the axial movement of an actuating plunger 67. The plunger 67 forms a central axial extension of the control element 57 and extends through the ring opening of the solder 27 in the direction of the shutoff valve 65. Plunger 67 interacts with valve 65 and unblocks valve 65 when the control element 57 is moved axially by the pretensioning of the spring when the solder 27 melts. When the shutoff valve 65 is opened in this way, the pressure in turn drops via cross channels 39.

To the extent that reference is made in the specification to media-carrying bores, such bores can also be formed by other channels with any cross section.

While various embodiments have been chosen to illustrate the invention, it will be understood by those skilled in the art that various changes and modifications can be made therein without departing from the scope of the invention as defined in the appended claims.

What is claimed is:

1. A safety device for containers loaded by gas pressure, comprising:
   a connecting device attachable to a pressure chamber of a container;
   a passage extending in said connecting device connecting the pressure chamber to an outside of the container;
   unmelted solder located directly in said passage and forming a sealing plug that melts due to a temperature increase and that blocks fluid communication between the pressure chamber and the outside of the container;
   a sealing cap on an end region of said passage forming a spring housing;
   a spring held in a tensioned state in said sealing cap by said unmelted solder;
   a control element movable axially in said passage by a spring force of said spring upon melting of said solder, said control element having a mandrel; and
   a rupturable disk in said passage normally blocking fluid flow through said passage, said mandrel being axially movable with said control element upon melting of said solder to piece said rupturable disk unblocking said passage for fluid flow between the pressure chamber and the outside of the container.

2. A safety device according to claim 1 wherein said solder is made of an alloy having a desired melting point.

3. A safety device according to claim 1 wherein said passage extends axially from an end of said connecting device bordering the gas chamber to said end region.

4. A safety device according to claim 3 wherein said passage widens in an axial position thereof spaced from said rupturable disk.

5. A safety device according to claim 4 wherein said spring, said solder and said control element are axially aligned in said axial section.

6. A safety device according to claim 5 wherein said control element is coaxially between said unmelted solder and said spring.

7. A safety device according to claim 6 wherein said mandrel extends axially through a central opening in said unmelted solder that is ring-shaped.

8. A safety device according to claim 7 wherein said control element comprises through openings spaced radially outwardly of said mandrel.

9. A safety device according to claim 8 wherein said sealing cap has a vent opening therein.

10. A safety device according to claim 3 wherein said connecting device is connected to said sealing cap, said end cap having an axial section of said passage in said sealing cap spaced from said rupturable disk.

11. A safety device according to claim 10 wherein said spring, said solder and said control element are axially aligned in said axial section.

12. A safety device according to claim 11 wherein said control element is coaxially between said unmelted solder and said spring.

13. A safety device according to claim 12 wherein said mandrel extends axially through a central opening in said unmelted solder that is ring-shaped.

14. A safety device according to claim 13 wherein said control element comprises through openings spaced radially outwardly of said mandrel.

15. A safety device according to claim 14 wherein said sealing cap has a vent opening therein.

16. A safety device according to claim 1 wherein said connecting device extends through an opening in a housing of the pressure chamber.

\* \* \* \* \*